D. M. MOTHERWELL.
HAY CARRIER.
APPLICATION FILED JAN. 30, 1908.
924,811.
Patented June 15, 1909.
2 SHEETS—SHEET 1.
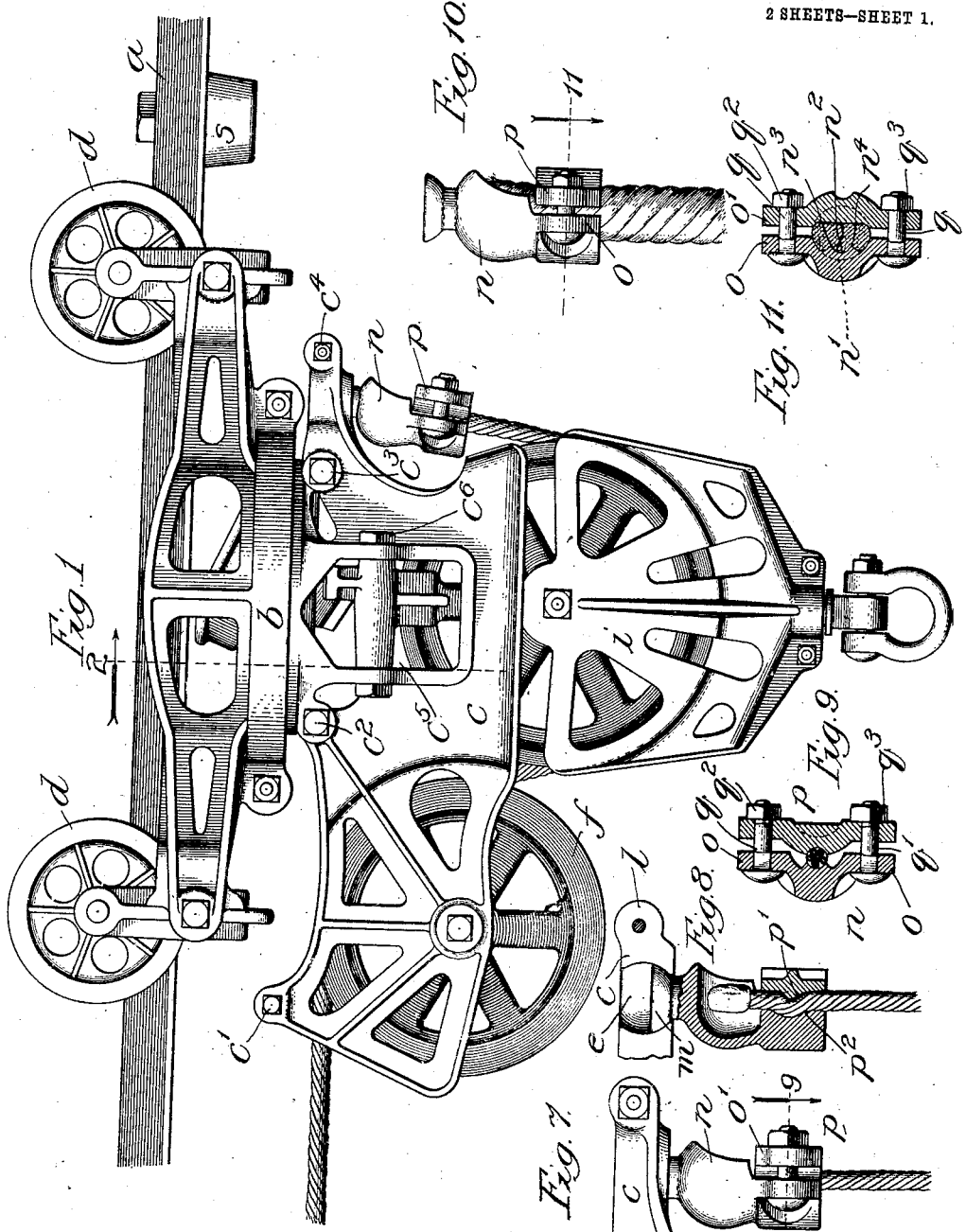
Witnesses:
John Enders.
Chas. H. Buell.
Inventor:
David M. Motherwell.
By Robert Catherwood
Atty.

D. M. MOTHERWELL.
HAY CARRIER.
APPLICATION FILED JAN. 30, 1908.
924,811.
Patented June 15, 1909.
2 SHEETS—SHEET 2.
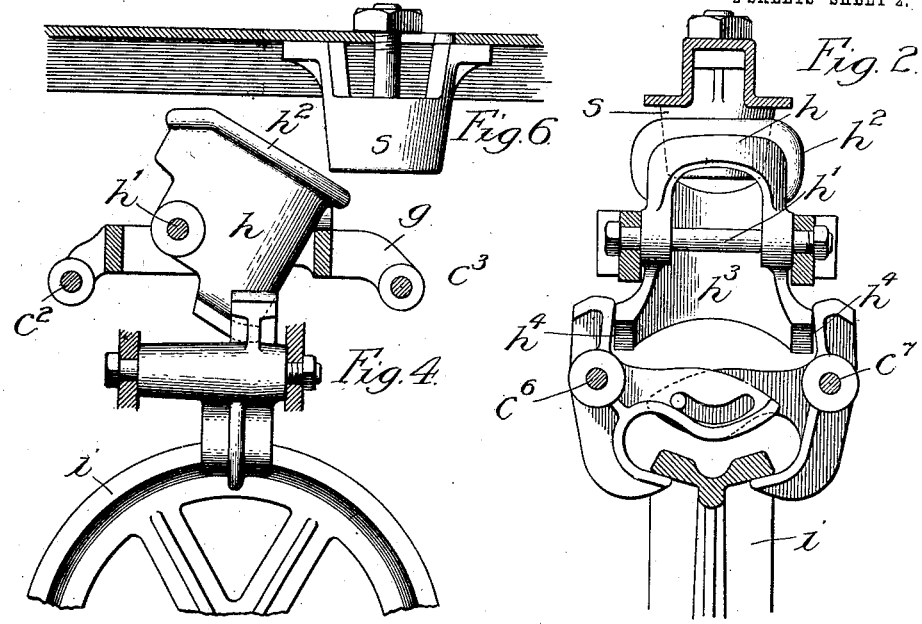
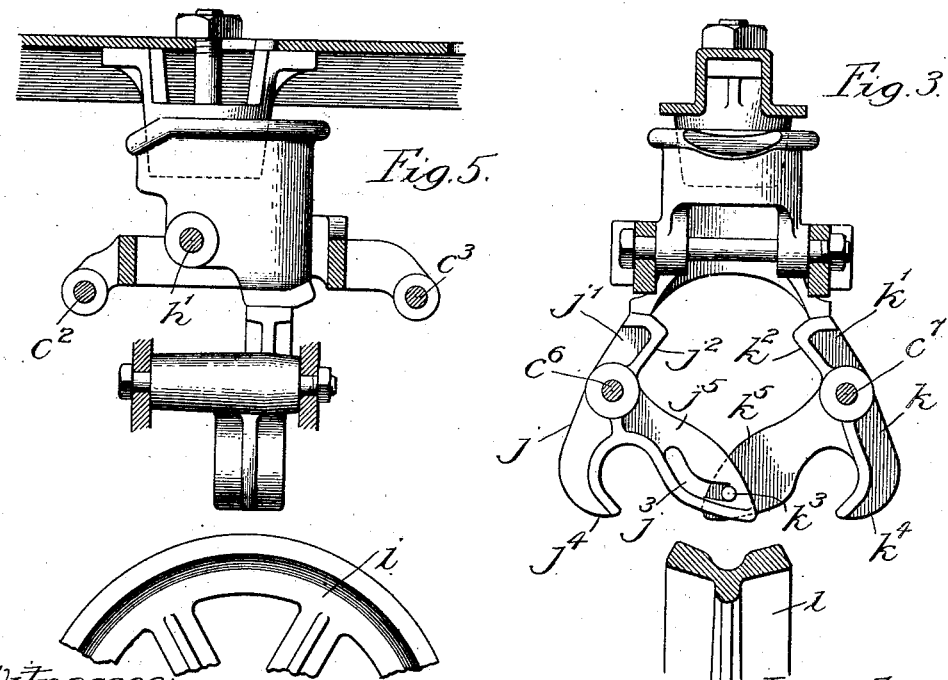
Witnesses:
John Enders
Chas. H. Buell
Inventor:
David M. Motherwell
By Robert Catherwood
Atty.

UNITED STATES PATENT OFFICE.

DAVID M. MOTHERWELL, OF CHICAGO, ILLINOIS, ASSIGNOR TO THE WHITMAN & BARNES MFG. CO., OF AKRON, OHIO, A CORPORATION OF OHIO.

HAY-CARRIER.

No. 924,811.     Specification of Letters Patent.     Patented June 15, 1909.

Application filed January 30, 1908. Serial No. 413,450.

*To all whom it may concern:*

Be it known that I, DAVID M. MOTHERWELL, a citizen of the United States, residing at Chicago, in the county of Cook and State of Illinois, have invented certain new and useful Improvements in Hay-Carriers, of which the following is a specification, reference being had therein to the accompanying drawings.

My invention relates to hay carriers. Its object is to provide an economical and durable device of this character adapted for use either with a draft rope or wire cable, having capacity for a gradual or easy trip without shock or strain to the parts as it enters or leaves its stop, and having a combined rope and wire cable clamp for automatically taking out twists in the draft rope or in a wire cable.

In the accompanying drawings I have shown a device embodying my invention in its preferred form, wherein—

Figure 1 is a side view of the hay carrier as a whole, showing the lifting pulley in locked position during transit of the carrier from one point to another upon the overhead track; Fig. 2 is an enlarged view, partly in section and partly in end plan, on line 2 of Fig. 1, illustrating the position assumed by the detents or grappling device in locking a load to the carrier; Fig. 3 is a similar view illustrating the position assumed by the parts when in unlocked position; Fig. 4 is partly a sectional and partly a side view of the parts shown in Fig. 2; Fig. 5 is partly a sectional and partly a side view of the parts shown in Fig. 3; Fig. 6 is a view of the stop showing a portion of the overhead way or track in section and illustrating the method of attaching the stop; Fig. 7 is a side view of the combined draft rope and cable clamp illustrating its use in securing a wire draft cable therein; Fig. 8 is a vertical sectional view of the same parts; Fig. 9 is a cross-section on line 9 of Fig. 7; Fig. 10 is a view similar to Fig. 7 showing the clamp and illustrating its use in securing a draft rope in position; and Fig. 11 is a cross-section on line 11 of Fig. 10.

In the drawings, $a$ represents a track or overhead way upon which the carrier runs, and to which the stop $s$ is bolted or otherwise suitably secured.

The frame of the carrier comprises an upper section $b$ and lower section $c$, swiveled together in the usual manner, suspended from the track $a$ by trucks $d$. On the forward end of the frame $c$ is secured the draft pulley $f$. The frame $c$ consists of two similar halves secured together by the bolts $c'$, $c^2$, $c^3$ and $c^4$, these bolts being threaded on the ends, and held in place by suitable nuts. Rigidly secured to the bolts $c^2$, $c^3$ is a bridge $g$, which encircles the tilting dog $h$, which is pivotally secured at its forward lower end to opposite inner edges or sides of the bridge $g$ preferably by the bolt or shaft $h'$. The dog $h$ is adapted to rock upon the bolt $h'$ as an axis or pivot. It is provided with a bell-mouth $h^2$ adapted to strike the stop $s$ at an angle and encircle it when drawn to the upright position shown in Fig. 5. Upon the lower rear portion of the dog a downward extension $h^3$ is provided with oppositely disposed beveled edges $h^4$, as shown in Figs. 1 and 2.

Each of the two similar halves of the frame $c$ are cut away on opposite sides so as to provide registering openings $c^5$, the opposite ends of each opening being provided with oppositely disposed laterally projecting ears. Across each opening and extending in the direction of travel of the carrier a bolt is secured to the ears, the bolt in one opening being indicated by $c^6$ and the bolt in the other by $c^7$. Upon the bolts $c^6$, $c^7$ are pivotally mounted a pair of detents $j$, $k$, each similar in construction, provided with the upward projections $j'$ $k'$, having the inner surfaces $j^2$ $k^2$ beveled, as shown in Figs. 2 and 3, and so arranged in relation to the dog $h$ that a gradual or wedge-like engagement between the surfaces $k'$ and the surfaces $j^2$ $k^2$ is provided when the detents are opened a certain distance. When the detents are drawn apart from under the dog the latter slides gradually between them, pushing them apart gradually. The opening and closing movement of the detents $j$ $k$, as they rock upon their axes or pivots $c^6$ $c^7$, substantially at right angles to the path of travel of the carrier, is limited by means of the slot $j^3$ on the central projection $j^5$ and a knob $k^3$ on the corresponding central projection $k^5$ projecting therethrough adapted to travel from end to end of this slot and contact with the end edges of it. The length of the slot $j^3$ is such that the projections $j'$ $k'$ may be rocked apart only a distance sufficient to allow the projection $h^3$ on the tilting dog $h$ to slide gradually into the openings between them. Curved fingers or hooks $j^4$ $k^4$ are provided on the lower portion of the detents $j$ $k$, adapted to engage the rim of the lifting pulley $i$ whenever the projections $j$ $k$ are rocked sufficiently far apart to admit the projection $h^3$ of the tilting dog $h$ between them. The inward rocking motion of the upward projections $j'$ $k'$ is also limited by the slot $j^3$ and projection $k^3$ to permit the said projections to rock under the opposite edges of the downward projection $h^3$, thereby supporting the dog $h$ in its lifted or elevated position.

My invention also provides means for correcting or removing the twists or kinks in the draft rope or cable, which, without such means, might affect the perfect working of the carrier by interfering with the entry of the hoisting pulley into the bell-mouth in proper position to operate automatically the grappling locking devices above described. I take the twist out of the draft rope or cable by fastening the rear end in a clamp device depending from the carrier and having a rotary or universal joint movement, so that when power is applied to the draft rope or cable to hoist the pulley the kinks or twists will run out at the end, turning this rotary clamp. I prefer to construct this device by recessing the two halves of the frame $c$ to form a socket $e$ when brought together and fastened by means of the bolts $c^4$ threaded and provided with nuts, as shown in Fig. 1. This socket embraces a knob or ball $m$ of the clamp member $n$, forming a ball-and-socket swivel joint. On the inner surface of the clamp member $n$ is a vertical groove or concavity $n'$ large enough to embrace the larger ropes or cables and within it a similar, but smaller, vertical groove or concavity $n^2$ is formed between projecting parallel ribs $n^3$ $n^4$ adapted to embrace cables or ropes of smaller diameter than those of $n'$, this groove being projected somewhat forward of the groove $n'$.

The upper portion of the clamp member $n$ may be conveniently hooded to afford protection to the extreme end of the draft rope or cable. On opposite sides of the clamp member $n$ suitable ears $o$ are provided having openings in registration with corresponding openings in similar ears $o'$ on a coöperating clamp member $p$. Through these openings the threaded bolts $q$ $q'$ are passed and secured by nuts $q^2$ $q^3$ so that the two clamp members $n$ and $p$ may be fastened together and tightened about a rope between them. The clamp member $p$ is reversible, that is, one side of it has a vertical channel groove or concavity similar to $n'$ with a horizontal rib $p'$ in registration with a corresponding recess $p^2$ on the opposite inner surface of $n$ with which it coöperates to deflect the rope and obtain a grasp thereon, and the other side a vertical channel, groove or concavity similar to $n^2$ having a horizontal rib $p^3$ in registration with the recess $p^2$ with which it coöperates to deflect the small size ropes or cables when this member is reversed, to obtain a grasp thereon. Thus the clamp $p$ may be locked to $n$ by means of $q$ $q'$ and $q^2$ $q^3$, with either side coöperating with $n$, depending on the size of the rope or cable to be fastened. Once fastened, the rope itself will turn out the twists and kinks by rotating the clamp members in the socket $e$.

The operation of my device is as follows. The carrier being arrested at the loading point and the load secured in the usual manner to the hoisting pulley $i$, one end of the rope or cable is clamped in the rope clamp. If a wire cable or small cable be used the member $p$ is bolted to $n$, as shown in Figs. 7, 8 and 9, but if a rope or large cable is used the member $p$ is reversed and bolted, as shown in Figs. 10 and 11. The other end of the rope is passed over pulley $f$ and attached to power, whereupon any kinks or twists in the rope or cable are taken out by the automatic turning of the clamp in socket $e$. The hoisting pulley thus rises into the bell-mouth of the carrier, strikes the central projections $j^5$ $k^5$ which rise before it and swing the upward extensions $j$ $k$ from under the dog $h$. This operation is performed without jar or shock because the curved or beveled surfaces $j^2$ $k^2$ and $h^4$ prevent any sudden fall of the dog. Generally, however, the parts assume the position shown in Fig. 2 and the hoisting pulley is locked to the carrier by the hooks $j^4$ $k^4$ held in position by the lower portion of the dog $h$. Continued application of power on the rope or cable draws the carrier along the overhead way to the stop $s$, which, striking within the bell-mouth $h^2$ of the dog, rocks the latter up from between the detent extensions $j'$ $k'$ when the weight of the load brings them together and frees the pulley from the hooks $j^4$ $k^4$.

I am aware that many modifications of my invention will suggest themselves to those skilled in the art, and I do not wish to be understood as limiting myself to the device described and shown, but

What I claim is:

1. In a hay-carrier, a frame, a pair of detents pivoted therein adapted to rock alternately in and out of engagement with a hoisting pulley, a tilting dog pivoted on said frame adapted to rock downward and to spread the upper ends of said detents apart and interlock said detents and pulley, and upward above the same to free the pulley and detents, the contacting surfaces of said dog and detents being beveled to form a wedge-like gradual engagement during the downward movement of the dog.

2. In a hay carrier, a frame, a grappling device pivoted therein, having upward extensions above the pivoted points provided with oppositely inclined bevel faces tapering inward from top to bottom and a tilting dog pivoted on said frame adapted to rock downward and to spread said upward extensions apart, the surface of said dog contacting with said extensions being beveled to form a wedge like gradual engagement during the downward movement of the dog.

3. In a hay-carrier, a bell-mouthed swivel frame adapted to receive a hoisting pulley, a pivoted grappling device for locking said pulley to the frame, a pivoted dog having an upward extension for engaging a fixed stop and a downward extension for spreading apart the upward extensions of said grappling device to lock the same, the contacting surfaces of said dog and upward extensions being beveled to form a gradual wedge-like engagement, whereby said pulley is gradually locked to said frame, substantially as described.

4. In a hay carrier, a frame having a socket formed near its rear end, a rope or cable clamp having a knob or projection adapted to be locked within the socket to form a universal joint connection between the clamp and frame, clamp members, one of which is reversible, and means for alternately locking and unlocking them about ropes or cables of different diameters substantially as described.

5. In a hay carrier, a frame, a rope or cable clamp having a universal joint connection therewith and clamp members, one of which is reversible, each provided with a plurality of curved recesses, those on the same member being of different diameters corresponding in diameter with those on the other member, and means for alternately locking and unlocking them substantially as described.

6. In a hay-carrier, a frame, a pair of detents pivoted therein adapted to rock alternately in and out of engagement with a hoisting pulley, a tilting dog pivoted on said frame adapted to rock downward and to spread the upper ends of said detents apart and interlock said detents and pulley, and upward above the same to free the pulley and detents, the contacting surfaces of said dog and detents being beveled, substantially as described.

In testimony whereof I hereunto affix my signature in the presence of two witnesses.

DAVID M. MOTHERWELL.

Witnesses:
ARTHUR GREENE,
CHARLES L. HINE.